United States Patent Office 2,946,543
Patented July 26, 1960

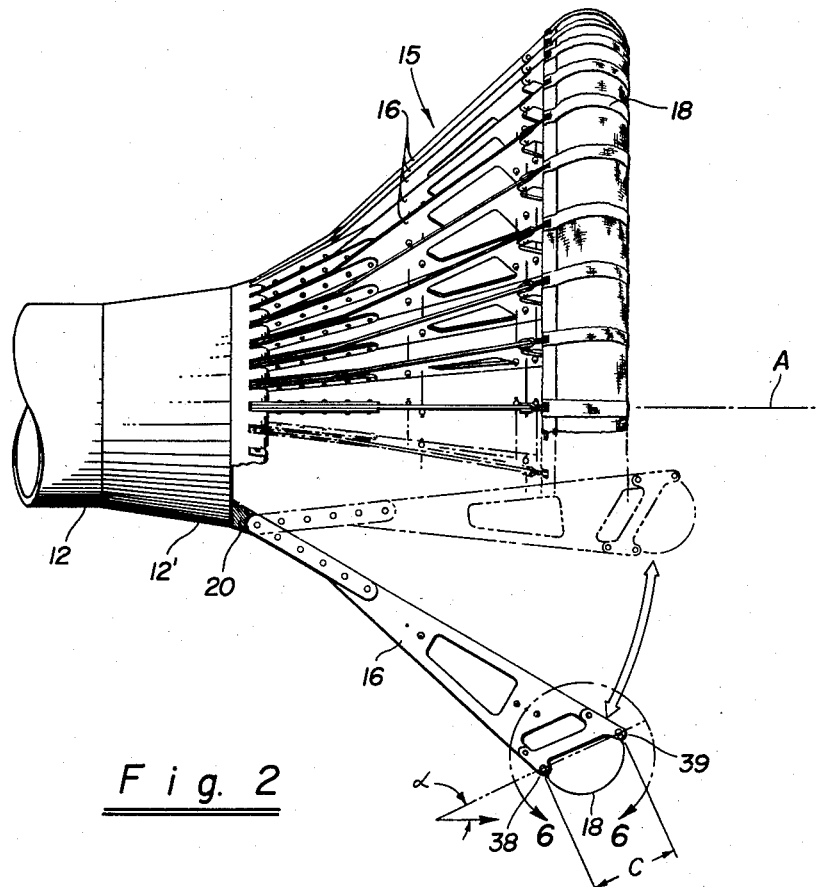

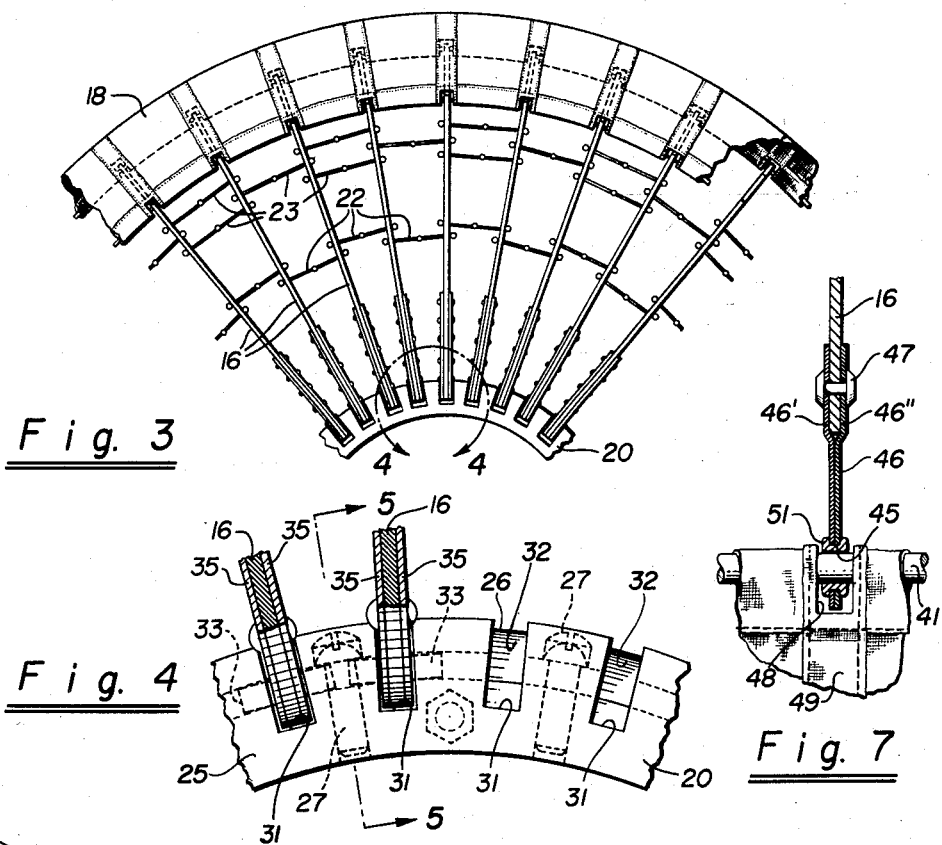
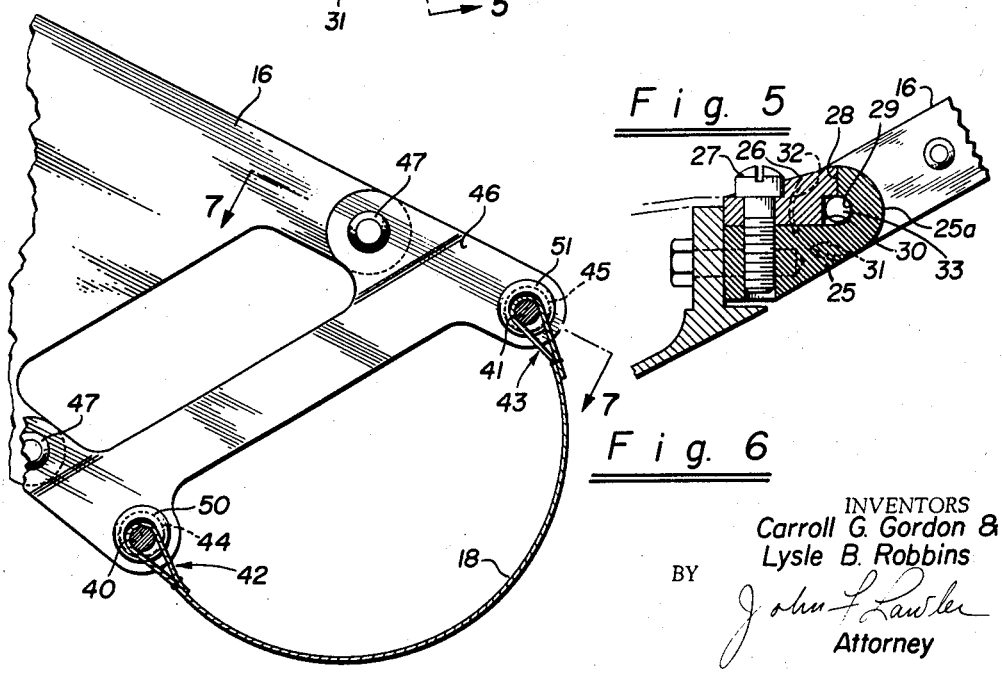

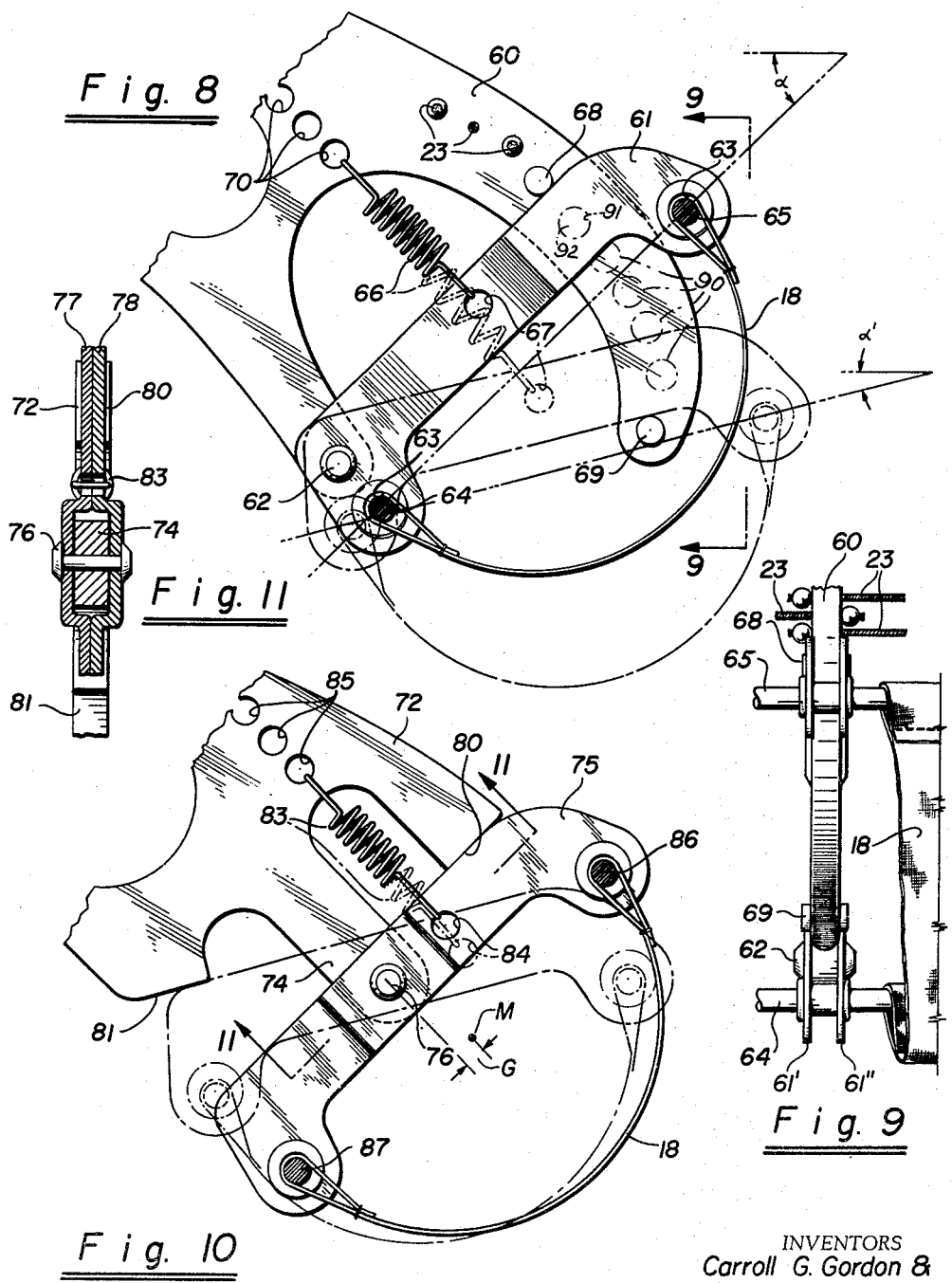

2,946,543

AERODYNAMIC DRAG DEVICE

Carroll G. Gordon, Menlo Park, and Lysle B. Robbins, Mountain View, Calif., assignors to Textron Inc., Belmont, Calif., a corporation of Rhode Island Filed Jan. 25, 1957, Ser. No. 636,371

16 Claims. (Cl. 244—135)

This invention relates to a collapsible airfoil drag device for an aircraft aerial refueling system.

Such a drag device, known as a drogue, is connected to a fuel engaging valve or reception coupling on the trailing end of a retractable fuel transfer hose which is payed out from a tanker plane or buddy. The drogue increases the drag load on the hose permitting insertion of the engaging valve or probe nozzle on the receiver aircraft into the coupling, stabilizing the coupling for aerial refueling, and additionally providing an adequate target area and a guide for the probe nozzle. The drogue when deployed is conically shaped and is foldable to minimize space requirements when stowed in the tanker plane. An annular canopy at the trailing end of the drogue is connected to the forward or coupling end by an annular array of struts or arms which are pivoted at their forward ends to permit collapsing and deployment of the drogue. The canopy is a continuous annulus made of flexible material having a constant width, and streams through the air in the manner of a parachute to apply the desired lift and drag forces to the coupling causing the stowed drogue to open when it enters the air stream.

Drogues of this type are susceptible to failure when used for aerial refueling of high speed aircraft traveling at indicated air velocities in the range of 0.6 to 0.9 Mach Number, such failure being characterized by a partial or total collapse or inward pivoting of the canopy support arms during flight. This results in an erratic flight pattern for the coupling and makes it difficult if not impossible for the receiver craft to connect to the coupling. This failure, called "squidding," is caused by a change in effective area of the canopy which reduces the total radially outward force or lift of the canopy as air velocity relative to the drogue increases until the moments tending to pivot the arms inwardly exceed the oppositely acting lift moments, and the drogue collapses.

A principal object of our invention is the provision of a drogue in which "squidding" at relatively high air speeds, that is, in the range of 0.6 to 0.9 Mach Number is entirely eliminated. Another object is the provision of a drogue in which the chordal spacing of the leading and trailing edges of the canopy is substantially constant; that is, rigid chord means are employed which hold these canopy edges apart so that the forward face of the canopy is always open and the area of this opening remains substantially the same under all flight conditions. Thus the open face of the canopy is prevented from closing even when the pressure loading of the canopy is relatively high. A further object is the provision of a folding drogue in which the canopy is connected to the fore part of the drogue by a single set of struts, each strut being secured to both the leading and trailing edges of the canopy. Still another object is the provision of a folding drogue in which uncontrolled change in the chordal spacing of the leading and trailing canopy edges is prevented without affecting the foldability of the drogue. A further object is the provision of drogue with means for conveniently attaching and detaching the canopy to and from the struts.

Another limitation of prior drogue constructions is the inability of the drogue to function effectively over a wide range of indicated air speeds. The drag of prior drogues is closely proportional to relative air speed. The resultant variation in drag with air speed has made necessary the use of different drogues for operation at different air speeds in order to avoid undue loading of the hose and reel mechanism and in order to provide the desired cushioning of the probe nozzle contact with the reception coupling.

Another object of our invention is the provision of a drogue having a substantially constant drag characteristic over a wide range of indicated air speeds. A further object is to provide a connection between the canopy and struts which automatically adjusts the effective airfoil area of the canopy in response to the air speed. A more specific object is to provide means for automatically adjusting the canopy angle of attack in proportion to the relative velocity of the air stream. Still another object is to provide a drogue capable automatically of developing a substantially constant horizontal drag force over a predetermined range of relative air speeds, together with convenient means for adjusting or selectively raising and lowering the speed range over which the drag remains the same.

These and other objects of our invention will become apparent in the following description of preferred embodiments thereof, reference being had to the accompanying drawings in which:

Figure 1 is a schematic representation of a tanker plane and a receiver plane using an aerial refueling system with a drogue of the type embodying our invention.

Figure 2 is an elevation of the drogue connected to the aft end of a reception coupling, a portion of the drogue being broken away to show details of the strut construction.

Figure 3 is a fragmentary end view of the drogue.

Figure 4 is an enlarged view of a portion of the strut pivot connection assembly shown in the circle 4—4 of Figure 3.

Figure 5 is a section showing details of the strut pivot connection, the section being taken on line 5—5 of Figure 4.

Figure 6 is a greatly enlarged elevation of the free end of the strut showing a detachable canopy connection.

Figure 7 is a transverse section taken on line 7—7 of Figure 6.

Figure 8 is an elevation of the free end of a drogue strut showing a modified form of connection of the canopy to the strut to provide a constant drag drogue.

Figure 9 is an end view of the strut shown in Figure 8, the view being taken on line 9—9 of Figure 8.

Figure 10 is a view similar to Figure 8 showing another form of canopy to strut connection providing a constant drag drogue.

Figure 11 is a section taken on line 11—11 of Figure 10.

A principal feature of the present invention is the novel connction of the annular canopy to the drogue support struts to achieve the several objects of the invention. In one form, the leading and trailing edges of the canopy are fastened to the free end of each strut with a fixed chordal spacing, and, when the drogue is deployed, with a constant angle of attack relative to the air stream, that is, the angle between the drogue axis or direction of the air stream and the line through the leading and trailing edge attachments of canopy to a strut. In another form of the invention, provision is made for varying the angle of attack of the canopy in proportion to the relative velocity and force of the air stream by permitting controlled expansion of the trailing canopy edge as the drag load increases. More specifically the canopy edges are connected to each strut by a chord-bracket which is pivotally mounted on the end of the strut, the bracket pivoting in response to an increase in lift and drag forces. The latter form of drogue develops a substantially constant canopy drag force over a wide range of indicated air speeds.

The drogue made in accordance with our invention is useful in an aerial refueling system illustrated schematically in Figure 1 in which a tanker plane 10 trails a retractable hose 11 terminating in a reception coupling or tanker fuel engaging valve 12 into which the forward probe nozzle or receiver engaging valve 13 of a receiver aircraft 14 is inserted for the transfer of fuel from the tanker to the receiver aircraft. It is desirable that coupling 12 be trailed at a position below the tanker plane 10, as shown in Figure 1, offset from the turbulent wake of the tanker, and that the coupling be stabilized in flight with sufficient target area to facilitate connection with the probe nozzle of the receiver. A drogue 15, preferably foldable to permit stowage within a minimum space in the tanker, fulfills this function and additionally serves to provide a wide target area for the receiver probe and to guide the probe into the coupling when initial contact is made.

A preferred form of our drogue is illustrated in Figures 2–7, inclusive, and comprises a plurality of preferably identical struts or arms 16 pivotally connected to coupling 12 and diverging rearwardly therefrom, to the right as viewed in Figure 2, for connection at their remote ends to an annular preferably continuous flexible airfoil canopy 18. The several struts 16 are individually pivotally connected at equally spaced points around a connection assembly 20 secured to the preferably flared tail end 12' of coupling 12, and are foldable between a deployed or extended position shown in solid line in Figure 2 to a folded position suggested in broken line in the same figure. Two or more sets of flexible, preferably steel segment, cables 22 and 23, see Figure 3, serve to interconnect adjacent struts at longitudinally spaced points along the struts for limiting outward movement of the struts in the deployed or operative position. The cables also prevent strut separation as the probe of the receiver aircraft strikes the drogue and slides forward to engage the reception coupling.

The strut pivot connection assembly 20, see Figures 3, 4 and 5, comprises an inner support ring 25 and an outer or retainer ring 26 which fits over and around the inner support ring and is secured thereto by a plurality of bolts 27. Inner ring 25 is formed with a curved rear face 25a, see Figure 5, and has a forwardly facing annular shoulder 28 defining a seat against which the retainer ring abuts when the rings are fitted together. Shoulder 28 and the mating face of ring 26 have opposed or complementary annular recesses 29 and 30, respectively, and a plurality of arcuately spaced rearwardly facing aligned slots 31 and 32 are formed in and over the entire circumference of rings 25 and 26 respectively. Each strut 16 extends into a pair of aligned slots 31 and 32 and carries a transverse pivot pin 33 which projects into complementary recesses 29 and 30 to pivotally lock the strut to the ring assembly.

The struts preferably are made of lightweight material such as aluminum or magnesium alloy, and each may be stamped, extruded or otherwise formed as a rigid unit structure. The body of the strut takes the form of a flat strap, the width or radial dimension of which is a minimum at the pivot end and increases to a maximum at the free or aft end to which the canopy is connected. Preferably the longitudinal edges of the struts are rounded to decrease drag of the struts and to eliminate damage to the probe nozzle when it contacts the inner edges of the struts. Reinforcing strips 35 may be riveted to opposite sides of the narrow pivoted ends of the struts to increase their rigidity.

The canopy 18 preferably is of the continuous airfoil parachute-type, made of suitable material such as eight ounce nylon parachute fabric, and has an outer generally circular leading edge 38 and a similar inner or trailing edge 39, these edges being connected to each of the several struts at radially aligned points. The diameter of trailing edge 39 is smaller than that of leading edge 38 and the canopy, when disposed in an air stream moving parallel to the canopy axis, expands or unfolds and assumes a semicircular cross sectional shape, thereby trapping a portion of the moving air stream to develop a drag force on the coupling. Circumferential support for the leading and trailing edges of the canopy is derived preferably from flexible hoop cords 40 and 41, respectively, which are made from suitable material, such as 1000 pound nylon cord, and which are threaded through casings 42 and 43 of the canopy. The canopy is connected to each strut by cords 40 and 41 which pass through openings 44 and 45 in a rigid strut extension or chord-bracket 46 removably connected to the wide free end of the strut by hollow rivets 47. It will be understood that bracket 46 may be made integral with the strut, if desirable. Bracket 46 preferably comprises a pair of rigid plates 46' and 46", see Figure 7, spaced apart for connection to the end of the strut and pressed together at the rear ends to receive the hoop cords. The canopy edges are recessed as indicated at 48 to clear the outer end of the bracket and a reinforcing strip 49, such as 500 pound nylon webbing, preferably is double stitched to the canopy at each strut attachment. Ferrules 50 and 51 in bracket holes 44 and 45, respectively, prevent chafing of the hoop cords by the struts.

The drag force developed by the canopy in an air stream is a function of the angle of attack $\alpha$, see Figure 2, which the deployed canopy makes with the air stream; the direction of the air stream, indicated by the arrow, normally being parallel to the drogue axis A during horizontal flight of the drogue and reception coupling. The canopy angle of attack of our deployed drogue is held constant and has a value selected to produce the desired drag and lift characteristics for the particular air speed at which refueling is to take place. The perimetrical spacing of the canopy connections to the struts is sufficiently small so that the tendency of the canopy under load to change its shape, and thus change the angle of attack, is prevented, and the desired drag and lift characteristics of the canopy, even at air speeds approaching the speed of sound, are attainable without "squidding" of the drogue. In other words, the canopy edges have a fixed chordal spacing C and are rigidly supported by and on each of the several struts and cannot stretch or elongate when subjected to high wind pressure loading. The proper angle of attack of the canopy for a given air speed and drogue drag can be calculated from well known principles of and equations on aerodynamic drag, such as those given in the volume entitled, "Aerodynamic Drag" by Dr. Sighard F. Hoerner, published in 1951 by Otterbein Press, Dayton, Ohio, and the manner of connecting and supporting the canopy as described above insures that the canopy dimension will remain constant while the drogue is in use.

By way of example, a drogue made according to the principles of our invention and which has been successfully tested, has the following dimensions and features: canopy inside diameter (trailing edge)—24"; canopy outside diameter (leading edge)—28.2"; canopy chord length C—3.5"; canopy material width—5.0"; number of struts—36; spacing between struts at canopy leading edge—2.45"; and at trailing edge—2.09"; angle of attack $\alpha$—37°; horizontal canopy drag component—565 pounds for true air speed of 540 knots at an altitude of 36,000 feet.

The drag force developed by the annular parachute-type canopy in a moving air stream is a function of the indicated air speed and the effective canopy area which is normal to the air stream. In other words, the angle between the chord line of the canopy and the direction of the air stream, called the canopy angle of attack, determines the effective drag producing area of the canopy which is presented to the air stream. It will be understood that since the coupling and drogue are designed to fly substantially horizontally during refueling operations, the canopy angle of attack may be measured with reference to the longitudinal axis of the drogue which is parallel to the air stream during flight conditions. According to the form of our invention described above, the canopy angle of attack is fixed and cannot change when the drogue is fully deployed because the leading and trailing canopy edges are supported directly on each strut. The hoop cords 40 and 41 remain circular and constant in diameter under flight conditions and are prevented from changing size or shape by reason of their connection to each of the struts. For a given tanker air speed which is optimum for the refueling of receiver aircraft, the drogue struts are designed to hold the canopy with a predetermined angle of attack that produces the desired drag and lift forces for efficient operation of the system. In many instances, aerial refueling is carried out at one optimum air speed and under such conditions, the drogue described above having a constant angle of attack functions efficiently.

The optimum aerial speed for refueling may vary for different types of tanker and receiver aircraft, or, for other reasons, the preferred air speed may be different from time to time. Under these circumstances, one drogue having a constant angle of attack cannot be used effectively because the drag it develops at the different air speeds will vary correspondingly. In other words, the drogue which has fixed parameters, including a fixed canopy angle of attack, develops a predetermined desired or optimum drag force for a given air speed but produces proportionally different drag forces as the air speed varies. Such variation in drag load at different speeds is undesirable because loads greater than the optimum load for which the drogue is designed increase the closing moments on the struts, tending to collapse them, and drag loads less than the optimum are accompanied by a corresponding decrease in canopy lift forces which, if reduced substantially, likewise result in the inward pivoting or collapsing of the struts. In addition, higher drag forces at higher air speeds cause undue tension loading of the hose and the reel mechanism, and make the reception coupling less yielding to impact of the probe nozzle thereby increasing the likelihood of damage to the drogue and coupling when initial contact is made. Heretofore, it has been necessary to use a different drogue for each of several different air speeds encountered in order to maintain a substantially constant drag force, each drogue having a different angle of attack.

Our invention comprehends a solution to this problem by provision of a single drogue which is capable of developing a substantially constant horizontal drag force for different air speeds. This is accomplished by resiliently pivotally mounting the canopy on the free ends of the struts so that the angle of the attack of the canopy is decreased in proportion to the velocity of air streaming through the canopy. The forms of canopy connections shown in Figures 8–11, inclusive, are illustrative of embodiments of the constant drag feature of our invention.

As shown in Figures 8 and 9, the free or outer end of each canopy support strut 60 is C-shaped and pivotally supports a canopy bracket 61 by means of a removable pivot pin 62 at the outside edge of the strut. Bracket 61 preferably comprises a pair of juxtaposed plates 61' and 62" spaced apart at their ends to straddle the strut, and having rearwardly extending ears formed with ferrule fitted openings 63 through which resilient cords 64 and 65, respectively, extend for supporting the canopy 18 as described above. A spring 66 extends between and is connected to holes 67 and 70 in the central parts of bracket 61 and strut 60, respectively, and urges bracket 61 to pivot about the pin 62 against a stop 68 on the upper portion of the strut, as viewed. A second stop 69 on the outer end of the strut limits rearward pivoting of bracket 61 about the pin 62.

Spring 66 exerts a substantially constant force on bracket 61 and normally holds the latter against stop pin 68 until the air speed at the lower limit of the air velocity range for which the drogue is designed is reacher, that is, the slowest optimum air velocity for refueling. The angle of attack of the canopy for this position of the bracket is a maximum, and is indicated as $\alpha$ in Figure 8. As the velocity of the air stream relative to the drogue increases above this lower limit, the air pressure and thus the drag force on canopy 18 likewise increase and spring 66 yields, permitting bracket 61 to pivot proportionately rearwardly and to decrease the canopy angle of attack correspondingly. The resultant proportional decrease in the angle of attack causes the canopy to stream more of the air passing through the drogue, and the horizontal drag force developed remains substantially the same as the drag force developed at said lowest air speed limit. Another pin 69 on the strut is angularly displaced from pin 68 and defines the other limit of pivoting of the bracket which when moved to the position shown in broken lines in Figure 8, against pin 69, provides the canopy with the minimum angle of attack $\alpha'$ required to maintain the drogue in the deployed state. Bracket 61 pivots from stop 68 to stop 69 as the air speed increases over a given range of speeds and the drag force remains constant or nearly constant while this occurs. In other respects, the drogue is constructed similarly to that shown in Figures 2–7 inclusive, described above.

It will be noted that as the angle of attack of the canopy changes in the form of the invention shown in Figure 8, the diameter of the canopy trailing edge must likewise change; that is, as the angle of attack decreases from its maximum value $\alpha$ to its minimum value $\alpha'$, the trailing canopy edge opening becomes larger while the canopy opening at the leading edge remains approximately the same or increases slightly. In order to accommodate such dimensional changes, the canopy material and hoop cords 64 and 65 are selected to have sufficient elasticity to stretch as the angle of attack changes while at the same time maintaining the concave cross sectional configuration of the canopy. Since the elastic canopy material and hoop cords act in the manner of ring springs, their spring rates are added to that of tension spring 66 in order to achieve the desired proportional angular displacement of canopy bracket 61. Adjustment of the tension of spring 66 permits selection of the range of air speeds over which bracket 61 pivots and this adjustment may be accomplished by connection of the spring to differently spaced anchoring holes 70 on strut 60.

Another form of canopy to strut connection which provides a substantially constant drag over a predetermined range of air speeds is illustrated in Figures 10 and 11. In this form, the free end of the strut 72 has a bracket support extension 74 which projects rearwardly, to the right as viewed in Figure 10, from the strut. A bracket 75 similar to bracket 61 described above is connected between its ends to strut extension 74 by a removable pivot pin 76, and the axis of pin 76 which is the pivot axis of the bracket is offset from the chordal mid point M of the canopy by a distance G. Point M represents approximately the center of pressure on the canopy and the distance G defines a moment arm of a couple responsible for pivoting of the bracket upon change of the pressure loading on the canopy. Bracket 75 preferably comprises a pair of juxtaposed plates 77 and 78, see Figure 11, spaced apart at their central parts for connection to the strut extension 74 and joined together at their ends for connection to the leading and trailing edges of canopy 18. Pivotal movement of the bracket about pin 76 is limited by inner and outer abutment faces 80 and 81, respectively, on the strut, the positions of the bracket at the limits of movement being shown in solid and broken lines.

Spring 83 is anchored at opposite ends to holes 84 and 85 in the bracket and strut, respectively, and normally urges the bracket against face 80, at which limit the canopy angle of attack is a maximum. As the velocity of the air stream in which drogue is disposed increases beyond a predetermined value, the increased pressure on the canopy produces moments about pin 76 and spring 83 yields to permit bracket 75 to pivot clockwise, as viewed in Figure 10, through an angle proportional to the increase in air velocity. The proportional decrease in the canopy angle of attack is effective to maintain a substantially constant canopy drag force over a predetermined range of speeds which may be selected through adjustment of the tension on spring 83 such as by connecting the spring in one of the several spring anchor holes 85 in the strut. As before, the canopy and cords 86 and 87 which connect the leading and trailing edges of the canopy to the bracket are sufficiently resilient to accommodate changes in diameter of the canopy openings.

The degree of stretch and contraction of the canopy assembly during pivoting of the brackets is minimized with the construction of Figure 10 because the bracket is pivoted at a point between its ends. Moreover, support for the canopy on the strut extension 74 is just sufficiently ahead of the center of pressure of the canopy to give low spring loads and nearly all the drag load of the canopy is taken at the support point.

It will be appreciated that various modifications of the above described embodiments of our invention may be made without departing from the precepts of the invention. For example, releasable lock means may be incorporated in the pivoted bracket assemblies shown in Figures 8–11, inclusive, which permits adjustment of the angle of attack of the canopy to different values within practical limits, and which thereafter locks the bracket in the preselected position so that the canopy angle of attack is fixed when the drogue is under load. One form of such lock means is suggested in broken lines in Figure 8, wherein the upper end portion of strut 60 is formed with a series of longitudinally spaced holes 90 with which an opening 91 in bracket 61 successively registers with strut holes 90 as the bracket is pivoted about pivot pin 62. A removable pin 92 extends through bracket opening 91 and one of the strut holes 90 to lock the bracket in a selected angular position. Spring 66 may be omitted in this arrangement. Such a modification essentially combines the advantages of the embodiments of Figures 2–7, inclusive and Figures 8–11, inclusive, and provides for non-automatic adjustment of the pivotally mounted chord-bracket.

Having now described the invention, what is claimed is:

1. A foldable drogue comprising an annular support, a plurality of struts pivotally connected to said support at arcuately spaced points, an annular flexible canopy having a first annular forward edge and a second annular aft edge, a rigid bracket for each strut connected to said canopy edges, and means for connecting said brackets to the respective struts.

2. A drogue having a longitudinal axis, comprising ring means, a plurality of substantially identical rigid struts pivotally connected to said ring means, an annular flexible canopy having a leading edge and a trailing edge, the diameter of said trailing edge being smaller than the diameter of said leading edge, each of said struts being connected to said canopy edges and maintaining a fixed chordal spacing therebetween, and means interlinking said struts for limiting outward pivoting of said struts to a deployed position with said canopy concentric of said axis.

3. A drogue having a longitudinal axis, comprising an annular support, a plurality of elongated arms connected to said support at equally spaced perimetrical points, a canopy having annular leading and trailing edges, each of said edges being directly supported on each strut so that the chordal spacing between the edges is substantially fixed, means interlinking said struts for limiting outward pivoting of said struts to a deployed position with each strut diverging from said support, said canopy being oriented so that a line through the connection of each strut to the canopy makes a substantially fixed angle with the drogue axis when the drogue is deployed.

4. In a drogue having a longitudinal axis, an annular support and an annular canopy axially spaced from each other and disposed concentrically of said axis, said canopy having a trailing edge remote from said support and a leading edge axially intermediate said trailing edge and said support, the diameter of said leading edge being substantially greater than the diameter of said trailing edge, and a plurality of rigid arms connected to said canopy and to said support, said arms having rigid means between the leading and trailing edges of said canopy for fixedly spacing said edges whereby the angle of attack of the deployed canopy with respect to the drogue axis is maintained substantially constant.

5. A drogue having a longitudinal axis and comprising an annular support, a plurality of rigid struts arranged around the circumference of said support and pivotally connected thereto at equally spaced points, each strut having an outer end remote from said support and having a radial dimension that is a minimum adjacent said pivotal connection and a maximum at its outer end, an annular canopy of flexible material having a substantially constant width and having first and second side edges, the diameter of said first canopy edge being greater than the diameter of said second canopy edge, means to connect radially spaced parts on said outer end of each strut to said first and second canopy edges, respectively, the chordal spacing between the connections of said canopy edges to each strut being less than the width of the canopy material whereby said canopy when expanded is concavely shaped facing said support.

6. The drogue according to claim 5 in which said canopy connection means comprises a hoop cord secured to each canopy edge, and means to connect said cords to each of the struts.

7. The drogue according to claim 5 in which said canopy connection means comprises a rigid bracket for each strut, hoop cords secured to said canopy edges, respectively, and connected to said brackets, and means to detachably connect said brackets to said struts, respectively.

8. A drogue having a longitudinal axis, comprising a plurality of rigid struts supported concentrically of said axis, a flexible annular canopy at one end of said struts, said canopy having a first edge and a second edge, and means to connect said edges to each strut comprising a rigid bracket connected to and fixedly spacing said canopy edges, said bracket being pivotally connected to the strut for limited movement whereby the angle of attack of the canopy relative to the drogue axis is changeable, and resilient means between said bracket and the associated strut for controlling the angular displacement of the bracket.

9. A drogue having a longitudinal axis, comprising a plurality of annularly arranged rigid struts, an annular support, means for pivotally connecting one end of each strut to said support, a parachute-type canopy having a leading edge and a trailing edge, and means to connect said canopy edges to the opposite end of each strut, comprising a bracket secured to each canopy edge, said bracket being pivotally supported on said opposite end of the strut for pivoting about an axis normal to the strut axis, stop means on said strut engageable with said bracket and limiting pivotal movement of the bracket through an angle of predetermined magnitude, and resilient means on said strut for urging said bracket against one of said stops.

10. The drogue according to claim 9 in which said resilient means is adjustable whereby to change the force exerted on said bracket.

11. In a drogue of the type described, a rigid strut, flexible canopy means having a leading edge and a trailing edge, a rigid chord-bracket connected to each of said canopy edges and pivotally supported on said strut, and resilient means interconnecting said bracket and said strut for controlling pivoting of said bracket in response to pressure loading of said canopy.

12. In a drogue of the type described, a canopy having a leading edge and a trailing edge, a plurality of rigid struts, connection means on said struts attaching said canopy edges to each of said struts with a fixed spacing between said edges, and means for adjusting said connection means for changing the position of said canopy relative to each strut.

13. In a drogue, a rigid strut, canopy means having a leading edge and a trailing edge, a rigid chord-bracket connected to each of said canopy edges and pivotally supported on said strut, and means on said strut for locking said bracket in different angular positions relative to said strut.

14. A drogue comprising a plurality of rigid struts, a flexible canopy having a leading edge and a trailing edge, and connection means for connecting both of said canopy edges to each of said struts.

15. The drogue according to claim 14 with means associated with said connection means responsive to pressure on said canopy for changing the position of said canopy relative to said struts.

16. The drogue according to claim 15 in which the diameter of said leading edge is larger than the diameter of said trailing edge, the last named means being operative to change at least with the diameter of said trailing edge.

References Cited in the file of this patent

UNITED STATES PATENTS 2,823,881    Patterson _____ Feb. 18, 1958

FOREIGN PATENTS 497,289    Great Britain _____ Dec. 16, 1938